No. 839,255. PATENTED DEC. 25, 1906.
J. I. AYER.
CIRCUIT OPENING DEVICE FOR ELECTRIC HEATERS.
APPLICATION FILED MAY 5, 1905.

Witnesses:
Fred S. Greenleaf
L. William Lutton

Inventor:
James I. Ayer,
By Crosby & Gregory
Attys.

The present invention guards against injury or destruction of the heater under these conditions by insuring the opening of the electric circuit when a dangerous temperature of the vessel has been attained.

UNITED STATES PATENT OFFICE.

JAMES I. AYER, OF CAMBRIDGE, MASSACHUSETTS, ASSIGNOR TO SIMPLEX ELECTRIC HEATING COMPANY, OF BOSTON, MASSACHUSETTS, A CORPORATION OF MASSACHUSETTS.

CIRCUIT-OPENING DEVICE FOR ELECTRIC HEATERS.

No. 839,255.  Specification of Letters Patent.  Patented Dec. 25, 1906.

Application filed May 5, 1905. Serial No. 258,922.

*To all whom it may concern:*

Be it known that I, JAMES I. AYER, a citizen of the United States, residing at Cambridge, county of Middlesex, State of Massachusetts, have invented an Improvement in Circuit-Opening Devices for Electric Heaters, of which the following description, in connection with the accompanying drawings, is a specification, like letters on the drawings representing like parts.

It is the object of this invention to protect an electrically-heated device from injury or destruction due to overheating. This object is secured by the provision of a circuit-opening device operated by a predetermined dangerous temperature of the heated device.

The invention may be embodied in various electrically-heated devices.

The invention is here shown embodied in a vessel for heating water or other liquids. It is generally desired that such a device shall operate very quickly, and it is therefore provided with a powerful electric heater of large capacity as compared with the area heated in order to produce quick results in heating or boiling water. Such a vessel if operated without the liquid easily becomes overheated in a short time and is either seriously injured or destroyed by such overheating. The present invention guards against injury or destruction of the heater under these conditions by insuring the opening of the electric circuit when a dangerous temperature of the vessel has been attained.

The drawings show the invention as embodied in an open vessel more particularly for heating liquids and illustrate the protective device in two different forms.

Figure 1:
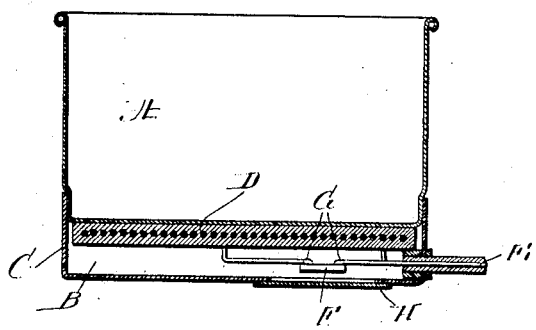
Figure 2:
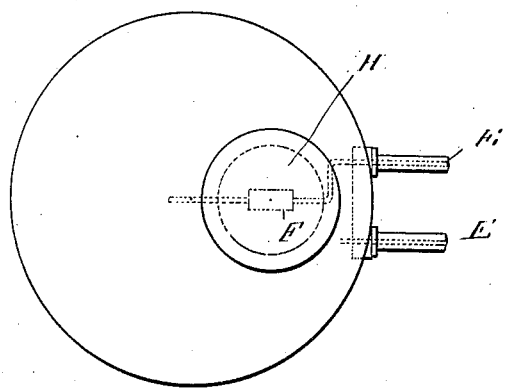
Figure 3:
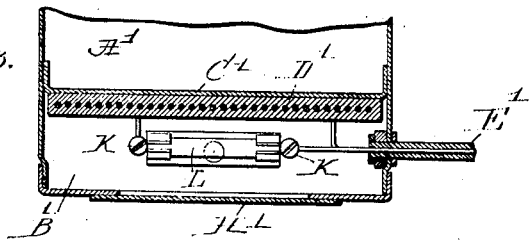
Figure 4:
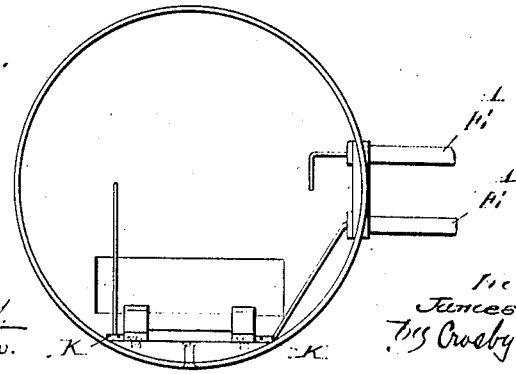

In the drawings, Figure 1 is a central vertical cross-section of a vessel for heating liquids embodying one form of the invention. Fig. 2 is a bottom plan view of the construction shown in Fig. 1. Fig. 3 is a view of the vessel, similar to that shown in Fig. 1, partially broken away and provided with a protective device of different form. Fig. 4 is a bottom plan view of the construction shown in Fig. 3.

A represents an open vessel adapted for the heating of liquids or other substances, shown as made of sheet metal. The vessel A is provided at the bottom with a chamber B, here shown as formed by the addition of a false bottom C to the vessel A. In this chamber and attached to the vessel A is located the electric resistance D, the terminals of which, E E, pass out to the exterior of the chamber for connection to the supplying-circuit.

In the chamber B is located the circuit-opening device, which in this form of the invention is shown as a metallic block F, attached to one of the terminals E below a break in the same by a fusible solder G.

Below the block an opening is provided in the chamber B with a removable cover H.

When the electric current is supplied to the device shown, any liquid or other substance should be heated in the usual manner in the vessel A. If, however, through neglect or otherwise the contents of the vessel A should boil away, evaporate, or if the vessel should not be filled in the first place, then the current being continually supplied the vessel would soon become overheated and eventually seriously injured or entirely destroyed. Before the vessel A attains a dangerous temperature the heat in the vessel is communicated to the solder. The surrounding air, and preferably, as in the present case, the air of an inclosed chamber B, acts to conduct the heat to the solder. The terminals connecting the solder and the heating-coil serve also to conduct the heat. When the heat rises sufficiently to melt the solder, the block F of course falls by gravity and the circuit is opened, preventing further heating of the vessel.

In the other form of the invention (shown in Figs. 3 and 4) a similar vessel A' is illustrated, provided with a similar chamber B at its base, formed by inserting the false bottom C' in the vessel.

The heat resistance D' and the terminals E' E' are similarly arranged. The circuit-opening device is in this case a fuse inserted between the binding-posts K K at a break in one of the terminals E'. This fuse, otherwise of any common form, comprises a heat-conducting inclosing shell L. When, as already described, the vessel A approximates a dangerous temperature, due to overheating, the heat conveyed through the air, and preferably the air of the inclosed chamber B', and also along the terminals from the heater, penetrating the conducting-shell L, acts to melt the fuse and open the circuit. The fuse being contained in the shell L, any arc formed by the break in the circuit will not injure the vessel or cause an explosion or other undesirable results.

An opening is provided in the bottom of the chamber B' adjacent to the fuse and has a removable cover H'.

In both forms of the invention illustrated when the circuit-opener has acted it is destroyed and has to be replaced.

A device of this character, designed as a protection against unusual occurrences and arranged to prevent serious injury or destruction to the vessel, has infrequent occasion for operation. It may therefore be replaced by the return of the vessel to the factory or by a skilled mechanic, although in some forms it may be arranged for replacement in a more simple manner. In the form shown in Figs. 1 and 2 the block must be resoldered in position, and in the form shown in Figs. 3 and 4 a new fuse must be placed in position. The cover H or H' may be fastened mechanically or soldered in position when a more permanent fastening is secured.

While the invention has been illustrated in two forms, it may be embodied in other constructions, and other circuit-opening devices may be employed so long as they are actuated by the heat of the vessel itself transmitted to the circuit-opening device.

Having described my invention, what I claim as new, and desire to secure by Letters Patent, is—

1. An electrically-heated device, a fusible circuit-opener located adjacent to but out of contact with the heated device whereby upon the overheating of the device the circuit will be opened and the device protected from injury.

2. An electrically-heated device comprising in its construction an auxiliary closed air-chamber, a fusible circuit-opener located within said air-chamber and adjacent to but out of contact with the heated device, whereby upon the overheating of the device the circuit will be opened and the device protected from injury.

3. An electrically-heated device comprising in its construction an auxiliary closed air-chamber, a fusible circuit-opener located within said air-chamber and adjacent to but out of contact with the heated device, whereby upon the overheating of the device the circuit will be opened and the device protected from injury, an opening into said air-chamber adjacent the fusible circuit-opener to permit access to the circuit-opener and repair or renewal.

In testimony whereof I have signed my name to this specification in the presence of two subscribing witnesses.

JAS. I. AYER.

Witnesses:
ELIZABETH M. CONLIN,
DORA A. PROCTOR.